July 12, 1955
A. H. RERICK
2,712,850
TUBELESS TIRE ASSEMBLY MACHINE
Filed July 13, 1953
5 Sheets-Sheet 1
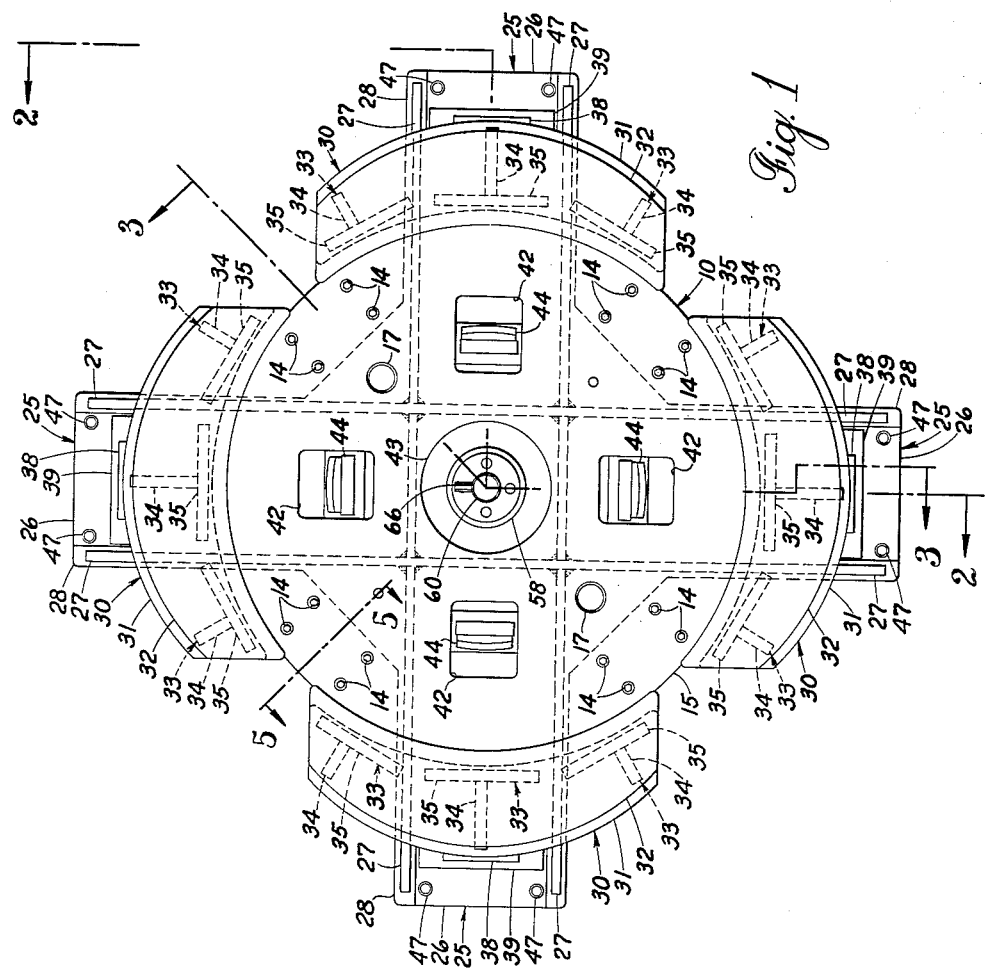
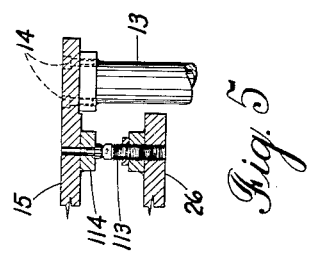
INVENTOR.
Albert H. Rerick
BY
ATTORNEYS.

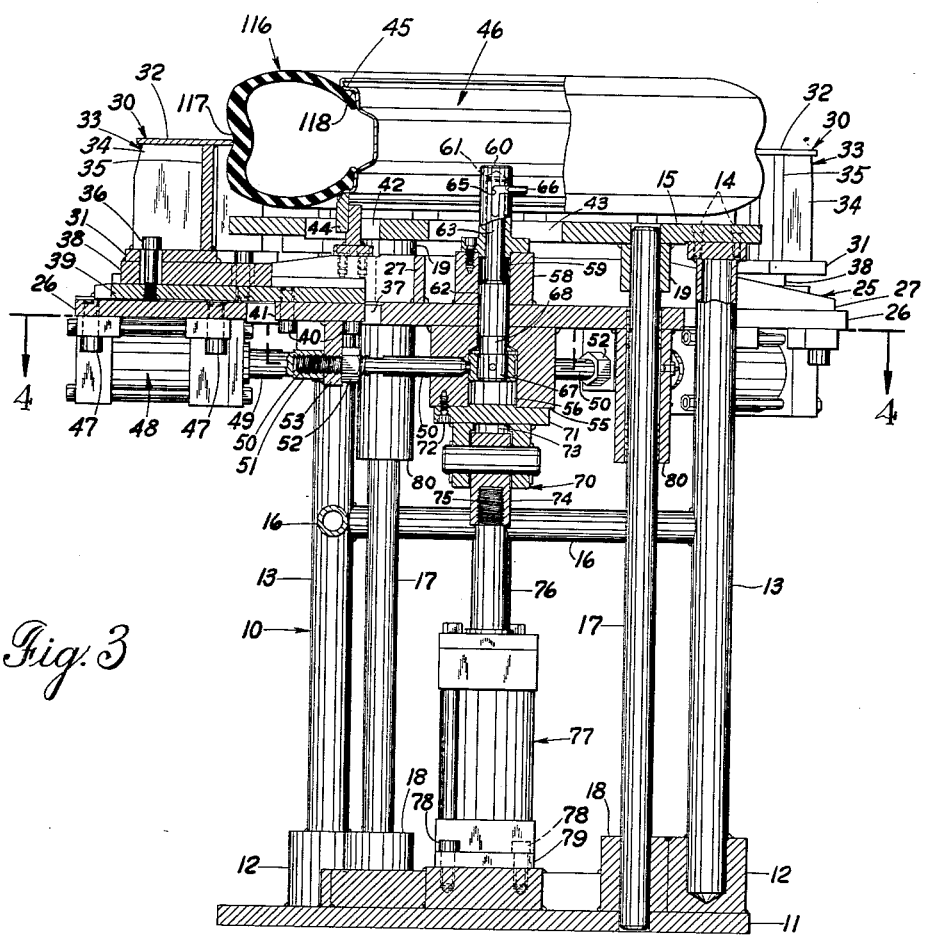

July 12, 1955
A. H. RERICK
2,712,850
TUBELESS TIRE ASSEMBLY MACHINE
Filed July 13, 1953
5 Sheets-Sheet 4
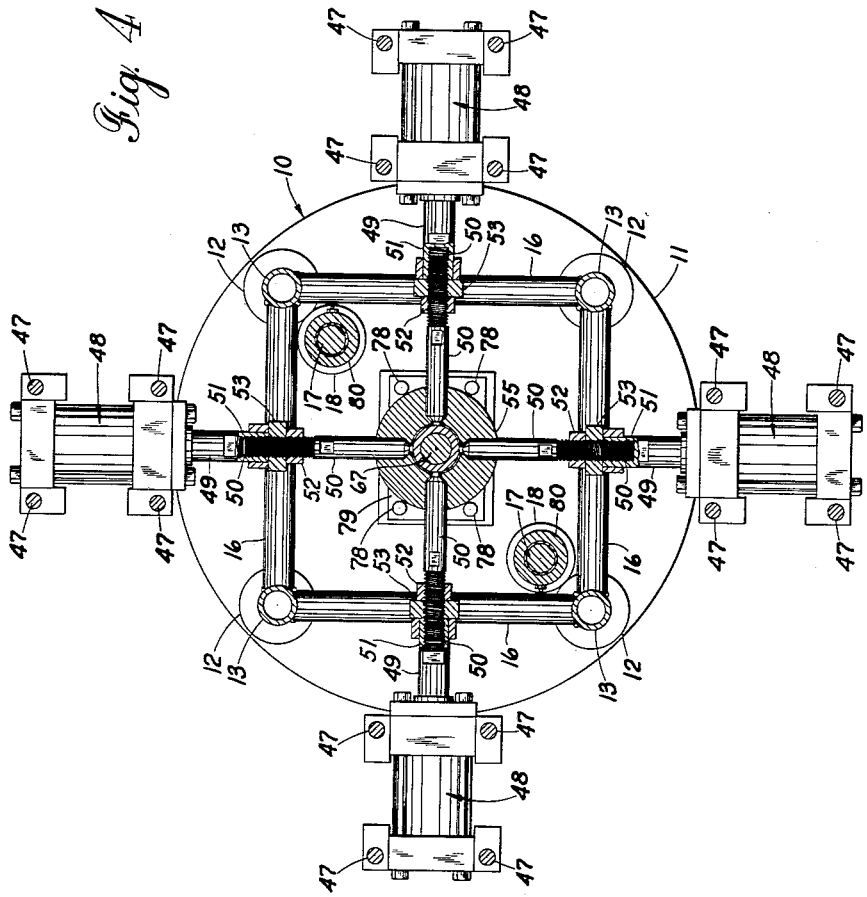
INVENTOR.
Albert H. Rerick
BY
Brown, Jackson, Boettcher & Dienner
ATTORNEYS.

July 12, 1955

A. H. RERICK 2,712,850

TUBELESS TIRE ASSEMBLY MACHINE

Filed July 13, 1953

INVENTOR.
Albert H. Rerick
BY
ATTORNEYS.

United States Patent Office 2,712,850
Patented July 12, 1955

2,712,850

TUBELESS TIRE ASSEMBLY MACHINE

Albert H. Rerick, South Bend, Ind., assignor, by mesne assignments, to Studebaker-Packard Corporation, a corporation of Michigan Application July 13, 1953, Serial No. 367,519

3 Claims. (Cl. 157—1.1)

My invention pertains generally to assembling devices and more particularly to a new and improved machine designed specifically to press the bead rings of a tubeless tire into locking engagement with the rim of a wheel.

With the advent of the recently accomplished tubeless tires for employment in the automotive field, in particular, problems have arisen relating to the assembling of such tires on vehicle wheels. Of particular importance in the assembly of such a tire is the locking of the bead rings thereof tightly against the rim of a supporting wheel. Practice to date has resorted to beating of such tires with a heavy mallet or employing a torniquet around the circumference of the tires which is then tightened to draw the bead rings of the tire into locking engagement with the rim of the wheel. In any event, the forcing of such bead rings onto the wheel rim requires great pressures and is difficult to accomplish with any amount of speed and accuracy. As a consequence, I have devised, as herein taught, a new and improved machine or assemblying apparatus which is capable of functioning in a simplified manner to force the bead rings of a tubeless tire, which is previously mounted on a wheel, into the desired mating engagement or relationship with the rim portions of the wheel of an automotive vehicle.

Briefly, the concept of operation involved in my new device employs means for locating the tire concentrically of a circular support from the peripheral portions of which are advanced four curvilinear shoe arrangements arranged to engage the tire approximately mid-way of its tread portion to force the same radially inward and snap the bead rings associated therewith into concentric mating relation against the inside beaded rim of a vehicle wheel.

The main object of my invention is to provide a new and improved machine for assemblying tubeless tires with vehicle wheels by forcing the bead rings of the tubeless tire into locking engagement with the rim portions of a vehicle wheel.

Another object of my invention is to provide a new and improved tubeless tire assembly machine arranged, through suitable control mechanisms, to perform by automatic operation, the engagement of the bead rings of a tubeless tire with the beaded rim portions of a vehicle wheel thereby to force the same into interlocking engagement.

Still another object of my present invention is to provide a new and improved tubeless tire assembly machine which embodies simplified means and arrangement of elements to accomplish the desired purpose of locking the bead ring portions of a tubeless tire with the rim portions of a vehicle wheel.

The above and further objects, features and advantages of my present invention will be recognized by those familiar with the art from the description and specifications thereof which follow and with reference to the illustration of one preferred embodiment of its features as found in the accompanying drawings.

In the drawings:

Figure 1 is a plan view of the assembling apparatus of my invention;

Figure 3 is another cross-sectional view, similar to Figure 2, taken substantially along the line 3—3 of Figure 1, looking in the direction of the arrows and showing the machine of my invention in operation;

Figure 4 is a sectional view taken along line 4—4 of Figure 3;

Figure 5 is a partial cross-sectional view at an enlarged scale, taken substantially along the line 5—5 of Figure 1 and showing the details of a stop arrangement utilized in my assembly machine.

Figure 2:
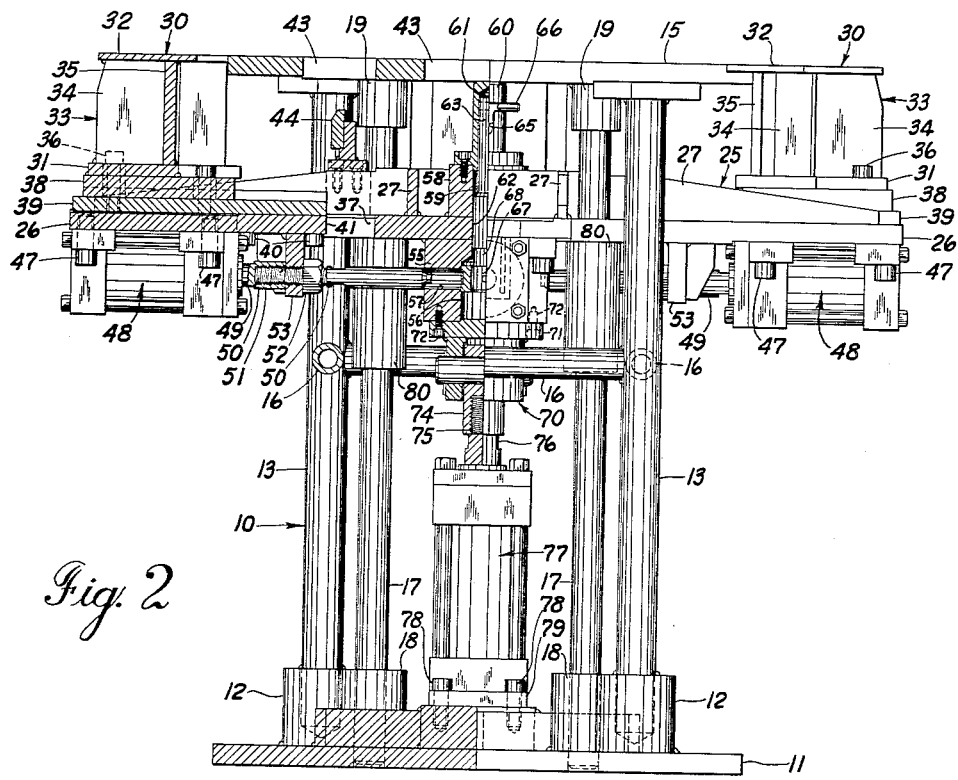
Figure 2 is a cross-sectional view taken substantially along the vantage lines 2—2 of Figure 1.

As will be recognized from Figures 1 through 4 of the drawings, especially, the assemblying machine 10 illustrated, comprises a ground engaging base member 11 having four cylindrical collars 12 positioned in uniform spaced array adjacent the periphery of the circular base 11. Such collars 12 each support a tubular or cylindrical rod stanchion 13, the upper ends of which are attached by screw means 14 to a circular table 15. Cross bars 16 interconnect the several stanchions 13 intermediate their ends to form a rigid tubular support structure for the circular table member 15. The several tubular members 13 and 16 are securely welded or otherwise rigidly interconnected. Also mounted upright from the base member 11 are a pair of diametrically spaced guide rods 17—17 having their lower ends housed in collar members 18—18 attached to base plate 11. The upper ends of rods 17 are similarly encased in collar members 19 depending from the underside of the circular table member 15.

Mounted intermediate the table member 15 and base plate 11 is a fixture 25 comprising a cross shaped plate 26 having reenforcing ribs 27 welded upright adjacent the edges of four extending arm portions 28 thereof. This forms a fabricated metallic structure having needed strength and rigidity. Adjacent the outer end of each of the arm portions 28 of cross plate 26, are mounted arcuate shoe structures 30, 30, each comprising a horizontal bottom plate 31, and a parallel spaced top plate 32. Mounted intermediate the bottom plate 31 and top plate 32 of each of the shoe structures 30 are a plurality of individual T-shaped support members 33, 33 each comprising a vertical web 34 and a transversely related plate 35. Each of such composite shoe structures is preferably fabricated of rigid material, such as steel plate, or the like and is slidingly fastened by bolt means 36 adjacent the outer end of each of the arm portions 28 of plate 26.

The bolt members 36 are arranged to pass through openings in the bottom plate 31 of each of the shoe structures and through a like opening in a spacer plate 38 therebeneath for threading engagement with a slide plate 39 located in contact with fixture plate 26. Bolts 40 tie a lug plate 41 beneath the radially innermost disposed end of slide plate 39. Each lug plate 41 is received slidingly in an elongated and substantially rectangularly formed aperture 37 located in the related arm portion 28 of the cross shaped plate member 26. Thus the supporting structure beneath each of the shoe assemblies 30 includes plate members 38, 39 and 41 which fit intermediate the rib members 27 projecting in spaced parallelism from the side edges of the arm portions 28. Such structure so formed is guided by the ribs 27 during sliding movement relative to the underlying support provided by arm portions 28 of the cross shaped plate 26. It will be noted that each of the arm portions 28 is furnished with one such sliding arrangement for supporting a shoe structure 30 thereon and that there are four moveable shoe structures in all with the curved top walls 32 related therewith encompassing substantially 360° of peripheral coverage adjacent the edge of the table 15.

Four substantially rectangular shaped openings 42, 42 are symmetrically arranged in table 15 (see Figure 1) one being disposed over each of the arm portions 28 of plate 26 and arranged in diametrically opposed pairs on opposite sides of a central circular opening 43 formed in table 15. Such openings 42 are designed to receive locating lugs 44, of which there are four, having a cascaded or stepped upper end which is designed specifically to engage the inside of bead portions 45 formed on wheel 46 (best illustrated in Figure 3). Such locating lugs are fixedly attached to the cross plate 26 so that as such plate moves vertically upward relative to table 15, the lugs 44 will extend up through openings 42 for engaging the rim 45 of wheel 46. The stepped formation at the upper ends of lugs 44 provides means for centering wheel 46 concentrically of table 15 and for supporting rim portion 45.

Connected beneath each end of the four arm portions 28 of cross plate 26 by bolt means 47, 47 is a hydraulic cylinder 48 having an internal piston related to piston rod 49. Each of such piston and cylinder arrangements is actuated by a hydraulic system (as will be described later herein) and serves to move a throw rod 50 having coaxial connection with a piston rod 49 by means of an internally threaded collar portion 51 at the end of rod 49 and a lock nut 52. Such throw rods 50, 50 extend through ear members 53 depending from the composite plate structures supporting the several shoe arrangements 30 and particularly from plate 41 thereof. Since the lock nuts and collars threadingly engage throw rods 50, 50 on opposite sides of the depending ear portion 53, it will be recognized that axially movement of the throw rod serves to carry the overlying shoe structure therewith while threading adjustment of the lock nut 52 and throw rod relative collar 51 regulates the attendant throw or sliding movement of the shoe structure relative to the cross shaped plate member 26.

Mounted rigidly to the underside of the fixture 25 and centrally thereof, is an enlarged lower hub member 55 having a central bore 56 opening inwardly of its lower end and which is entered laterally from four directions by cylindrical bores 57 suitable for receiving the individual throw rods 50. On the opposite face of the cross shaped plate 26 from hub member 55 and in coaxial relation with the latter, is an upper hub member 58 likewise having a central cylindrical bore 59, superposed by T-shaped cap member 60 also having a central axial bore 61 coaxially related with the bores 56 and 59 of the two hub members.

Additionally, the cross shaped plate member 26 is fitted with a central opening 62 whereby a cylindrical limit rod 63 may be inserted slidably within the interior of the assembled two hub members 55 and 58 and cap member 60. The cap member 60 is further fitted with a slotted opening 65 extending through its side walls and formed with interconnected vertical and horizontal portions to form a track or guideway. A pin member 66 fixed to the limit rod 63 projects into opening 65 for manual engagement whereby the same may be aligned with either the horizontal or vertical portion of slot 65, as desired.

Further, the limit rod 63 is provided with an enlarged cylindrical portion 67 at its lower end which is located immediately below an annular recess 68. By adjusting the pin member 66 to either the horizontally or the vertically disposed portion of slot 65, positioning of either the cylindrical portion 67 or the recessed portion 68 of the limit rod can be made so as to oppose the adjacent ends of the throw rods 51 riding in the bores 57. In this manner, inward radial movement of the throw rods with respect to the lower hub member 55 and thus the eventual inward limit of shoe assemblies 30 is regulated.

Mounted to the bottom face of the hub member 55 and depending therefrom is a collar member 70 having a widened flange portion 71 at its upper end which is secured over the lower end of the hub member 55 by bolt means 72. The collar member 70 has central bore 73 opening from its lower end for receiving the upper end of a cylindrical adjustment link member 74 having an opening inwardly of its lower end provided with suitable threads 75 for engaging the upper end of a piston rod 76 actuated by a master cylinder and piston assembly 77. This master cylinder and piston assembly 77 is secured by bolt means 78 and flange member 79 to the supporting base 11 as is best shown in Figures 2 and 3 of the drawings. Briefly, actuation of the piston rod member 76 by the master cylinder and piston assembly 77 serves to elevate or depress vertically the fixture 25, as will be explained more fully hereinafter.

Since the fixture 25 is to move vertically with respect to the circular table 15, two suitable guide sleeves 80, 80, are provided depending from the underside of the cross shaped plate member 26 to concentrically surround and ride slidingly along guide rails or rods 17 (see Figure 3). Thus when the piston rod 76 of the master piston and cylinder assembly 77 is moved vertically upward the same serves to push the fixture 25 therewith, guiding of such vertical movement of the fixture being assured by the sleeve members 80, 80.

Figure 6:
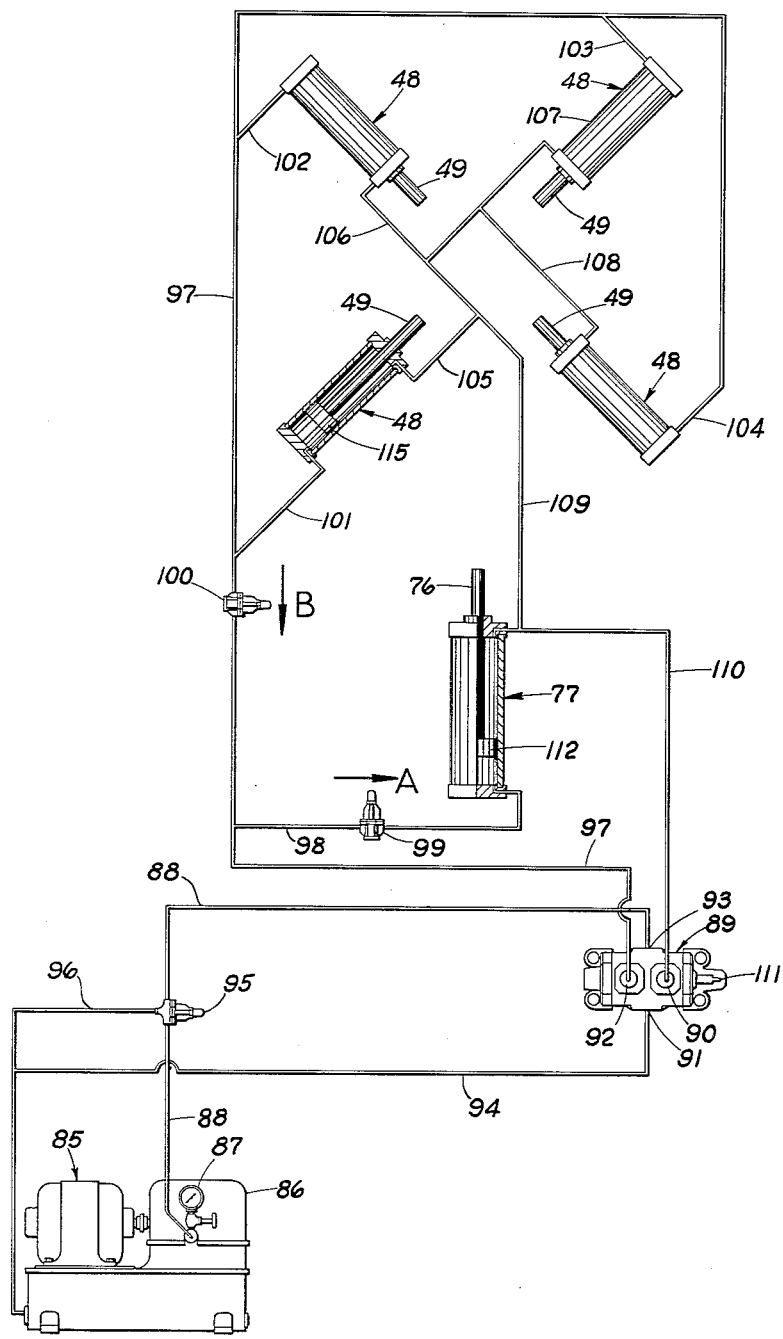
Figure 6 is a diagrammatic showing of a hydraulic control system employed for operating my new and improved assembling machine.

In regard to the operation of the individual shoe operating cylinder assemblies 48 and the master cylinder and piston assembly 77, an inspection of the diagrammatic Figure 6 of the drawings will be most helpful. From Figure 6 it will be recognized that the same represents a schematic diagram of a hydraulic or pneumatic system for actuating the several cylinder and piston assemblies related with the machine I have hereinabove described. Briefly, I prefer to employ compressed air for the purposes of my present control system although hydraulic liquids will serve the purpose with equal facility.

In order to provide a source of pressurized fluid for the pneumatic system of my machine, I employ a standard compressor and motor arrangement indicated generally at 85 and having a storage tank 86 fitted with pressure indicating gauge means 87. On the discharge side of the storage tank a supply line 88 leads to a neutral chamber in a two way hydraulic or pneumatic control valve 89. This type of control valve is well known and essentially comprises a chamber in which a rod member or piston having reduced port portions slides relative to three outlet connections 90, 91, 92 and one inlet connection 93 in the valve body.

As will be appreciated when the valve means 89 is positioned such that the inlet 93 thereof communicates with the discharge outlet 91 as would occur in a neutral actuating position in the valve, pressurized fluid can pass through the valve from line 88 into a return line 94 leading to the suction side of the system's compressor. It will further be recognized that between the discharge side of the storage tank and the intake 93 of valve means 89, a pressure relief valve 95 is provided in line 88. This relief valve is arranged in a manner so that if excessive pressures should cause it to lift the fluid will be bled back into line 94 and the suction side of the compressor via a by-pass line 96.

The two control circuit outlets 90 and 92 of the master control valve respectively communicate with unlike ends of the cylinder assemblies 48 and 77, illustrated. For example, if the master control valve 89 is conditioned so that pressurized fluid will pass from line 88 through the control valve and into the discharge outlet 92, a conduit 97 will carry the pressurized fluid to a branch conduit 98 having a by-pass and check valve 99 therein which permits free flow of fluid according to the direction of arrow A in Figure 6, but allows flow in the opposite direction only at preselected pressures. Conduit 97 also leads from its junction with the line 98 to a second by-pass and check valve 100 which permits free flow of pressurized fluid therethrough according to the direction of arrow B, indicated in Figure 6, but limits flow in the opposite direction until a pre-set pressure in line 97 has been built up. Beyond the second by-pass and check valve 100 is connected a network of piping including branches 101, 102, 103 and 104, which carry the pressurized fluid to the bottom side of the several cylinders 48 operatively associated with the four shoe assemblies 30. The upper ends of the several cylinders 48 are further interconnected by a network of piping including branch lines 105, 106, 107 and 108. These latter named lines are connected by pipe line 109 to pipe line 110 which connects discharge outlet 90 of the control valve 89 with the upper end of the master cylinder and piston assembly 77.

In the operation of the hydraulic or pneumatic system described and illustrated, the two pressure by-pass and check valves 99 and 100 are set to open at definite or preselected pressures; the set pressure of valve 100 being somewhat higher than for valve 99. Therefore, with the selective hand lever 111 of the master control valve positioned to permit pressurized fluid to pass through conduit 97 and the by-pass valve 99 being free flowing in accordance with the direction of arrow A illustrated, fluid will be admitted first to the lower side of piston 112 in the master piston and cylinder assembly 77. This will initially move the piston 112 upwardly and, as will be remembered, the upper end of the piston rod 76 is interconnected with the fixture 25 so that the same will be elevated from its Figure 2 position to that illustrated in Figure 3 of the drawings. At this point an assembled tire and wheel which have been previously placed on the table member 15, will be concentrically surrounded by the individual shoe structures 30 and held in place by the locating lugs 44. When the fixture table 25 has been elevated so that an adjustable stop member 113 associated with the cross plate member 26 engages a pad means 114 depending from the underside of the table member 15, as shown in detail by Figure 5 of the drawings, the by-pass and check valve 100 will open to permit air to flow through conduits 101, 102, 103, and 104 to the lower end of the individual piston and cylinder assemblies 48. This forces the pistons 115 therein and the throw rods 50 associated therewith radially inward to their stop position as regulated by the adjustment of rods 50 and the vertical positioning of the limit rod 63 within the hub member 55. This inward radial movement of the rod members 50 serves to carry the shoe assemblies 30 (particularly walls 32 thereof) radially inward to engage the tire 116 and compress the same radially inward substantially along the mid-line of its tread portion 117.

Such compression of the tire 116 serves to snap the bead rings 118 thereon tightly against the adjacent face of the bead rim portion 45 of the wheel 46. As will be understood, the tubeless style of safety tire to which the machine of my present invention pertains, carries a layer of adhesive material along the outer face of its bead rings 118 so that by pressing the same into engagement with the inside face of the beaded edge of the wheel rim 45 the same are sealed tightly with the wheel to form an internal annular chamber suitable for carrying pressurized air required for inflating such tires.

After the bead rings 118 have been snapped into engagement with the rim of the wheel 46, reversal of the master control valve 89 so that pressurized air can pass from conduit 88 through the outlet 90 of the master control valve into conduit 110, serves to initially provide air to the upper side of piston 112 within the master piston and cylinder assembly 77. However, since the by-pass and check valve 99 is free flowing in one direction only in accordance with arrow A, immediate downward movement of piston 112 will not take place due to pressure on the underside of such piston. Instead, the air or pressurized fluid will pass initially into the upper side, or radially innermost end of the individual piston and air assemblies 48 to force the piston members 115 therein radially outward carrying therewith the shoe structures 30 so as to release the tire 116. When such pistons 115 have reached the end of their strokes the by-pass and check valve 100, will open at a certain built up pressure permitting the pressure at the top of the master cylinder 77 to force the piston 112 therein downwardly, lowering the fixture 25 until the same reaches its Figure 2 position.

In regard to the overall operation of the machine as discussed hereinabove, it will be appreciated that as the fixture 25 is raised by the operation of master cylinder assembly 77, the locating lugs 44 carried thereby are extended through openings 42 of the circular table 15 to engage the rim 45 of the wheel 46 and thus locate the same concentrically with respect to the axis of the table 15. As stated before, when the fixture 25 has been raised to its full position so that the stops 113 engage pad members 114, the several shoes 30 are then moved radially inward simultaneously to engage the tire 116 at approximately the mid-point of its tread portion forcing the bead rings therein into tight interlocking engagement with the stepped rim of the wheel. This provision of a means for pressing the tires into engagement with the wheel rim has done much in the way of satisfying a need for a means of assembling safety tires of the tubeless variety with their supporting wheels. Further my machine substantially eliminates the back breaking labor and inaccurate task of performing this operation that has been resorted to heretofore in the industry.

It will therefore be appreciated that while I have herein shown and described one form in which the features and concepts of my invention may appear, numerous changes, modifications and substitutions of equivalents may be resorted to therein without departing from the spirit and scope of my teachings. As a consequence, I do not wish to be limited to the particular form of my invention herein shown and described except as may appear in the following appended claims.

I claim:

1. Apparatus of the class described for assembling tubeless tires on supporting vehicle wheels, comprising in combination, a ground engaging base, a planar table member supported in spaced parallelism over said base, a substantially cross-shaped fixture plate mounted beneath said table and having diametrically opposed arm portions extending outwardly of the periphery of said table, guide rail means extending between said table and base and having sliding connection with said fixture plate for guiding the same vertically toward and away from said table, piston and cylinder means for elevating and depressing said fixture plate vertically relative to said table, a plurality of tire engaging shoe assemblies, one slidably mounted at the outer end of each of said fixture plate's arm portions, piston and cylinder means for simultaneously moving said shoe assemblies radially with respect to said table's center, and wheel engaging lug means carried by said fixture plate and arranged to project upwardly through said table when said fixture plate is raised to an upper limit of travel; the arrangement being such that an assembled tire and wheel supported on said table is located concentrically thereof and aligned horizontally with respect to said shoe assemblies by the engagement of said lug means with the rim of the wheel so that the tire is engaged substantially at the crown of its tread portion and substantially throughout its circumference when said shoe assemblies are moved radially inward to a predetermined stop position.

2. An apparatus for pressing the bead rings of a tubeless tire onto the rim of a supporting wheel, comprising in combination, a base, a tire and wheel supporting table carried by said base and disposed in spaced parallelism thereover, a substantially cross shaped fixture plate, having diametrically opposed arm portions extending outwardly of the periphery of said table, mounted horizontally beneath said table; means for raising and lowering said fixture plate rectilinearly relative said table, means for guiding said fixture plate during its said movement, tire engaging shoe assemblies mounted adjacent the outer ends of the fixture plate's arm portions and arranged for sliding movement thereover, means carried by and with said fixture plate for simultaneously sliding said shoe assemblies radially in and out with respect to the center of said table, stop means adjustable for regulating the radial travel of said shoe assemblies, and locating lug members carried by said fixture plate and arranged to extend through openings formed in said table when said fixture plate is raised to its upper limit of travel, such lug members engaging and concentrically locating a wheel and tire supported on said table; inward radial movement of said shoe assemblies serving to compress the tire radially inward toward the rim of a supporting wheel therefor and thus to snap its bead rings into engagement with said wheel's rim portion.

3. An apparatus of the class described for pressing the bead rings of a tubeless tire into engagement with the rim portion of a wheel, comprising in combination, a ground engaging base, a circular table supported in spaced parallelism over and by said base, a fixture plate mounted for vertical rectilinear movement beneath said table and parallel to the plane thereof, means for guiding said fixture plate during its movement, a plurality of tire engaging shoe assemblies slidably mounted on said fixture plate outwardly of the periphery of said table, hydraulic piston and cylinder means for simultaneously actuating said shoe means radially in and out with respect to the center of said table, additional hydraulic piston and cylinder means for raising and lowering said fixture plate vertically relative to said table, control valve means regulating the supply of pressurized fluid to said two named hydraulic piston and cylinder means, and combination check and bypass valves for regulating the admission of pressurized fluid to said named hydraulic piston and cylinder means in time delayed sequence; such combination check and bypass valves and control valve means being arranged in hydraulic circuit with said two named piston and cylinder means for causing the raising of said fixture plate prior to the inward radial movement of said shoe assemblies and the outward radial movement of said shoe assemblies prior to the lowering of said fixture plate.

References Cited in the file of this patent

UNITED STATES PATENTS

| 1,399,770 | House | Dec. 13, 1921 |
| 1,578,760 | Replogle | Mar. 30, 1926 |
| 1,738,504 | Stevens | Dec. 3, 1929 |
| 1,966,580 | Bull | July 17, 1934 |
| 2,485,166 | Repas | Oct. 18, 1949 |
| 2,513,756 | Smyser | July 4, 1950 |